United States Patent
Ogawa et al.

[11] Patent Number: 5,864,632
[45] Date of Patent: Jan. 26, 1999

[54] MAP EDITING DEVICE FOR ASSISTING UPDATING OF A THREE-DIMENSIONAL DIGITAL MAP

[75] Inventors: Yukio Ogawa; Tomoko Hatakeyama, both of Kokubunji; Shigeru Kakumoto, Kodaira, all of Japan

[73] Assignee: Hitachi, Ltd., Tokyo, Japan

[21] Appl. No.: 720,434

[22] Filed: Sep. 30, 1996

[30] Foreign Application Priority Data

Oct. 5, 1995 [JP] Japan .................................. 7-258995

[51] Int. Cl.[6] ....................................................... G06K 9/00
[52] U.S. Cl. .......................................... 382/113; 382/294
[58] Field of Search .................................. 382/113, 154, 382/284, 294; 340/995; 342/64; 701/200, 208

[56] References Cited

U.S. PATENT DOCUMENTS

| | | | |
|---|---|---|---|
| 4,876,651 | 10/1989 | Dawson et al. | 364/449 |
| 4,984,279 | 1/1991 | Kidney et al. | 382/1 |
| 5,155,774 | 10/1992 | Numagami | 382/1 |

FOREIGN PATENT DOCUMENTS

| | | | |
|---|---|---|---|
| 60-95474 | 5/1985 | Japan | G09B 29/00 |
| 3-196372 | 8/1991 | Japan | G06F 15/62 |
| 5-181411 | 7/1993 | Japan | G09B 29/00 |

*Primary Examiner*—Andrew W. Johns
*Attorney, Agent, or Firm*—Antonelli, Terry, Stout & Kraus, LLP

[57] ABSTRACT

A map editing device capable of easily supplementing insufficient information and easily re-measuring an object that has changed. An image, a perspective projection map, a projection center and a projection angle are displayed in superposition. When a user manually changes the projection center and the projection angle, a perspective projection map after this change is generated and displayed. When a perspective projection map capable of obtaining insufficient information is determined, an imaging condition capable of obtaining the insufficient information can be determined based on the projection center and the projection angle at that time. The insufficient information can be easily supplemented if the arrangement is so made as to acquire images conforming with the imaging condition. The condition necessary for re-measurement can be determined.

13 Claims, 18 Drawing Sheets

INPUT IMAGE $(X_1, Y_1, Z_1)$
$(X_2, Y_2, Z_2)$
$(X_3, Y_3, Z_3)$
⋮

804

SUPERPOSED VIEW

COORDINATES TRANSFORMATION
COEFFICIENT CORRECTION OF MAP

——— PERSPECTIVE PROJECTION MAP
(MAP INFORMATION HELD IN ADVANCE)

- - - - - SUPERPOSED IMAGE

—— PERSPECTIVE PROJECTION MAP
(MAP INFORMATION HELD IN ADVANCE)

• MAP REFERENCE POINT OF
PERSPECTIVE PROJECTION MAP

---- SUPERPOSED IMAGE

○ GROUND CONTROL POINT OF
SUPERPOSED IMAGE

MAP CHANGE POINT DISTRIBUTION DIAGRAM

10 ~

5 ~ 10

1 ~ 5

0

— PERSPECTIVE PROJECTION MAP
(MAP INFORMATION HELD IN ADVANCE)

● MAP REFERENCE POINT OF
PERSPECTIVE PROJECTION MAP

---- SUPERPOSED IMAGE

○ GROUND CONTROL POINT OF
SUPERPOSED IMAGE

— PERSPECTIVE PROJECTION MAP
(MAP INFORMATION HELD IN ADVANCE)

● MAP REFERENCE POINT OF
PERSPECTIVE PROJECTION MAP

---- SUPERPOSED IMAGE

○ GROUND CONTROL POINT OF
SUPERPOSED IMAGE

— PERSPECTIVE PROJECTION MAP (MAP INFORMATION HELD IN ADVANCE)

● MAP REFERENCE POINT OF PERSPECTIVE PROJECTION MAP

---- SUPERPOSED IMAGE

○ GROUND CONTROL POINT OF SUPERPOSED IMAGE

MAP EDITING DEVICE FOR ASSISTING UPDATING OF A THREE-DIMENSIONAL DIGITAL MAP

BACKGROUND OF THE INVENTION

1. Field of the Invention

The present invention relates to a map editing device, more particularly, to a map editing apparatus which assists to update a three-dimensional digital map of an area by utilizing images obtained by imaging the area.

2. Description of the Related Art

JP-A-60-95474 discloses a prior art technology entitled "GENERATION METHOD OF PREMISE MANAGEMENT DIAGRAM" which collates an aerial photograph of an area with a map (two-dimensional map) of the area and detects object shapes not coincident between them.

JP-A-3-196372 discloses a technology entitled "POSITIONING APPARATUS OF IMAGES" which effects coordinates transformation for a two-dimensional numerical value map comprising (X, Y) coordinate lines to generate a perspective projection map, and collates the map with images.

JP-A-5-181411 discloses a technology entitled "MAP INFORMATION COLLATION/UPDATING METHOD" which effects coordinates transformation for a three-dimensional numerical value map comprising (X, Y, Z) coordinate lines to generate a perspective projection map, collates this map with an aerial photograph and updates map information by information regarding objects in the aerial photograph images when collation of the objects in the perspective projection map with the objects in the aerial photograph images proves successful.

According to the prior art technology described in JP-A-60-95474 described above, the aerial photograph and the map are superposed and collated with each other. However, the aerial photograph is based on the perspective projection whereas the map is based on the orthographic projection, and deviation resulting from these projection methods is unavoidable, and detection accuracy is low. Further, because the two-dimensional map does not have information of the object's altitude, there remains the problem that the virtual change of the object cannot be detected.

The prior art technology of JP-A-3-196372 involves the problem that because the two-dimensional digital map comprising the (X, Y) coordinate lines does not have information regarding the object's altitude, the technology cannot detect the virtual change of the object.

Though the technology described in JP-A-5-181411 can detect the change of the objects inclusive of the virtual change, there remains the problem that the map information can be updated only by a manual operation if collation between the object in the perspective projection map and the object in the aerial photograph image proves unsuccessful. (When a building is lost or is built afresh, for example, the map information cannot be updated automatically).

All these prior art technologies do not at all consider means for supplementing insufficient information, means for making it easy to re-measure an object that has changed, means for making it easy to determine an area in which a lot of changes of objects have occurred, and so forth.

SUMMARY OF THE INVENTION

It is a first object of the present invention to provide a map editing device which can easily supplement insufficient information and can easily remeasure an object that has changed.

It is a second object of the present invention to provide a map editing device which can easily determine an area in which a large number of changes of objects occur.

It is a third object of the present invention to provide a map editing device which can automatically update a three-dimensional digital map even when a building is lost or is newly built.

According to the first aspect of the present invention, there is provided a map editing device for assisting updating of a three-dimensional digital map of an area by utilizing an image obtained by imaging the area, which comprises coordinates transformation means for generating a perspective projection map from the three-dimensional digital map to a coordinate system on which the images are based, by utilizing imaging parameters of the images, collation means for establishing correspondence between a point as the reference of the shape of an object contained in the perspective projection map (map base point) and a point as the reference of the shape of an object contained in the image (ground control point), map change point stipulation means for stipulating a point (map change point) at which an object changes from a map base point and a ground control point not corresponding to each other map edition means for editing a three-dimensional digital map on the basis of the map change point, perspective projection map display means for generating a new perspective projection map from a projection center and a projection angle changed by the instruction of a user and from the three-dimensional digital map after the edition and displaying the map, and imaging condition acquisition means for acquiring an imaging condition corresponding to the projection center and the projection angle instructed by the user.

The map editing device described above detects the change of the object inclusive of the virtual change, and updates the map to a three-dimensional digital map. Because the image is taken from one map view point, however, there is a portion which is not shown in the image due to a dead angle, and there is the case where the information necessary for updating is partially insufficient. Therefore, the user manually moves the map view point. Then, the perspective projection map viewed from the map view point so moved is generated from the updated three-dimensional map and is displayed, and in this way, the map view point at which the insufficient information is obtained can be determined. The imaging condition under which the insufficient information is obtained can be determined based on this map view point. Therefore, the insufficient information can be easily supplemented by making the arrangement so that the image conforming with this imaging condition is acquired.

According to the second aspect of the present invention, there is provided a map editing device wherein additional image acquisition means for acquiring a new image corresponding to the imaging condition described above is further provided to the map editing device constituted in the first aspect described above. According to the construction, the new data for acquiring the insufficient information, that corresponds to the imaging condition, can be acquired from a data base or a network, and the insufficient information can be easily supplemented.

According to the third aspect of the present invention, there is provided a map editing device wherein new image acquisition schedule date submission means for reporting the date on which the new image corresponding to the imaging condition can be acquired, is further provided to the map editing device constituted in the first or second aspect described above. According to this construction, the date on which the new image (for example, a satellite photograph) for acquiring the insufficient information, corresponding to the imaging condition can be acquired (for example, the date on which the satellite photograph taken from the position corresponding to the imaging condition described above is periodically distributed) is submitted, so that the date on which the insufficient information can be supplemented can be known conveniently.

According to the fourth aspect of the present invention, there is provided a map editing device wherein measurement assistance information submission means for submitting attribute information such as the address of the existing position of the map change point, etc, as measurement assistance information is further provided to the map editing device constituted in the first to third aspects described above.

Since the map editing device described above offers the attribute information such as the address of the existing position of the map change point, etc, the re-measurement plan of the changed object can be easily set up.

According to the fifth aspect of the present invention, there is provided a map editing device for assisting to update a three-dimensional digital map of an area by using the images obtained by imaging the area, which comprises coordinates transformation means for generating a perspective projection map for a coordinates system on which the images are based, from the three-dimensional digital map by utilizing imaging parameters of the images, collation means for establishing correspondence between a point as the reference of the shape of an object contained in the perspective projection map (map base point) and a point as the reference of the shape of an object contained in the image (ground control point), map change point stipulation means for stipulating a point at which an object changes (map change point) from a map base point and a ground control point not corresponding to each other, and map change point number submission means for calculating and submitting the number or density of the map change points of the whole area or a region inside the area.

Since the map editing device constituted according to the fifth aspect quantitatively presents the changes of the object shapes, a region having many changes of the objects can be easily grasped, and the re-measurement plan can be set up easily.

According to the sixth aspect of the present invention, there is provided a map editing device for assisting to update a three-dimensional digital map of an area by using images obtained by imaging the area, which comprises coordinates transformation means for generating a perspective projection map for a coordinates system on which the images are based, from the three-dimensional digital map by utilizing the imaging parameters of the image, collation means for establishing correspondence between a point as the reference of the shape of an object contained in the perspective projection map (map base point) and a point as the reference of the shape of an object contained in the image (ground control point), and map editing means for adding a new object to the three-dimensional digital map on the basis of a ground control point not having a corresponding map base point and deleting an object corresponding to the map base point from the three-dimensional digital map on the basis of the map base point not having the corresponding ground control point.

In the map editing device described above, the object is automatically increased or even deleted when the map base point and the ground control point do not correspond to each other. Therefore, even when a building is lost or is built, the three-dimensional digital map can be automatically updated.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein.

DESCRIPTION OF THE PREFERRED EMBODIMENTS

Hereinafter, preferred embodiments of the present invention will be explained with reference to the accompanying drawings, but the present invention is in no way limited thereto.

Figure 1:
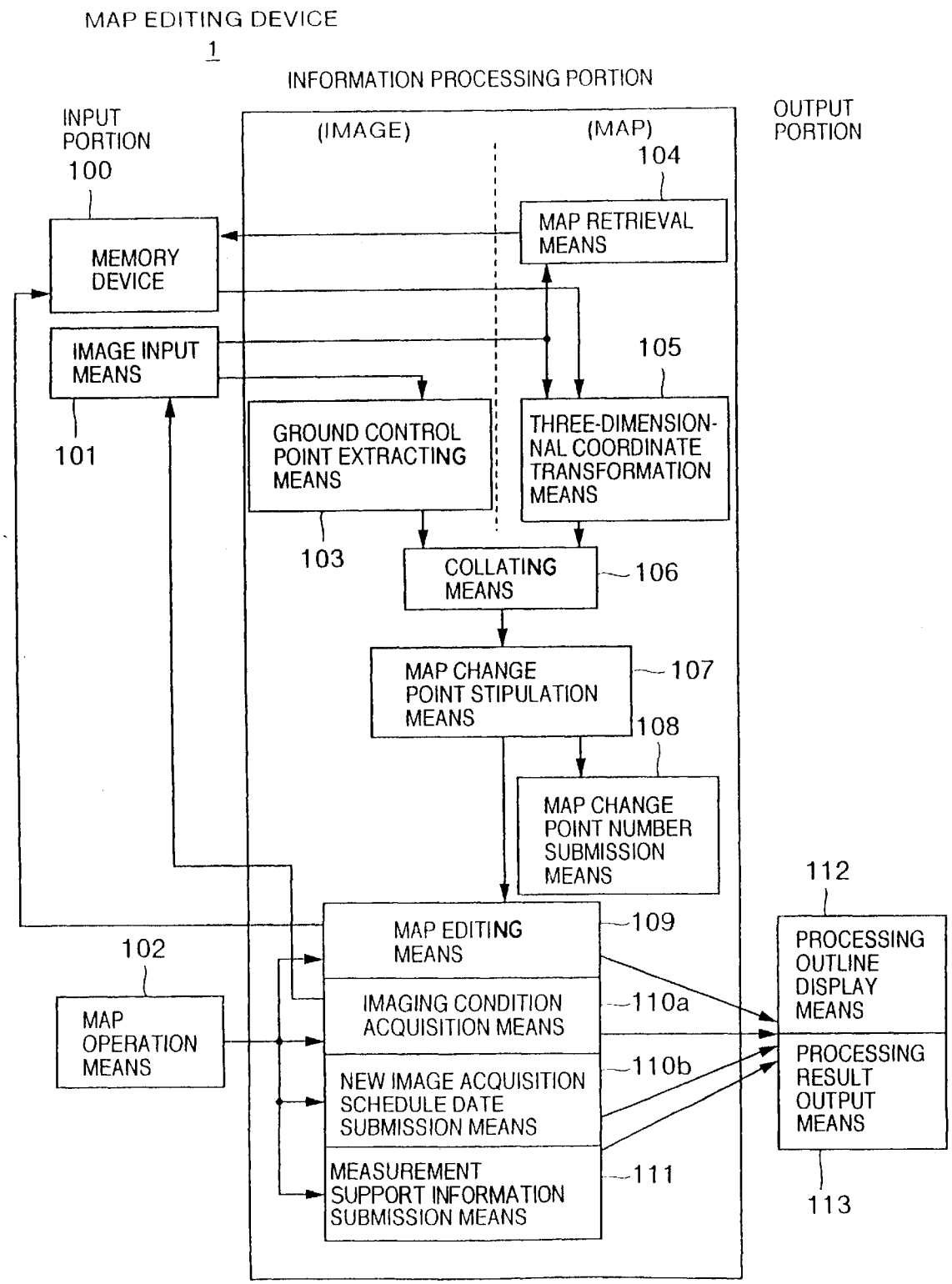
FIG. 1 is a functional structural view of a map editing device according to an embodiment of the present invention.

FIG. 1 shows in functional and structural diagram a map editing device according to an embodiment of the present invention.

Image input means 101 inputs an image from a scanner or a network and imaging parameters such as the position, direction, focal length, etc, of a camera at the time of imaging of the image, to ground control point extraction means 103. The image input means 101 acquires an image conforming with the later-appearing imaging condition from a data base or the network, and inputs the image and the imaging parameters such as the position, direction, focal length, etc, of the camera at the time of imaging of the image, to the ground control point extraction means 103.

The ground control point extraction means 103 executes an image processing for the input image, and extracts a point as the reference of the shapes of objects contained in the image (ground control point).

Map retrieving means 104 retrieves a three-dimensional digital map of an area corresponding to the imaging area of the image from a map file inside a memory unit 100 on the basis of the imaging parameters of the input image, and inputs the three-dimensional digital map to three-dimensional coordinates transformation means 105. The three-dimensional coordinates transformation means 105 executes three-dimensional coordinates transformation for the input three-dimensional digital map on the basis of the imaging parameters, generates a perspective projection map expressed by a perspective projection, extracts characterizing points (end points of shape contour lines such as roads, crossings, etc) inside the three-dimensional digital map, and sets them to map base points.

Collation means 106 superposes the image with the perspective projection map, and establishes the correspondence between the ground control point and the map base point.

Map change point stipulation means 107 stipulates or specifies those map base points which do not have the corresponding ground control points and those ground control points which do not have the corresponding map base points, as map change points.

Map change point number submission means 108 calculates the number (or density) of the map change points of the whole area and the number (or density) of the map change points for each region such as an administrative district or blocks in each area, and submits them as a graph or numerical values.

Map operation means 102 transmits a user's command on the map operation to map edition means 109, imaging condition acquisition means 110a, new image acquisition schedule date submission means 110b and measurement support information submission means 111.

The map editing means 109 executes a map editing processing which adds a change relating to the map change point to the three-dimensional digital map.

The imaging condition acquisition means 110a acquires an imaging condition of an image capable of supplementing insufficient information.

The new image acquisition schedule date submission means 110b submits the date on which a new image corresponding to the imaging condition described above can be acquired.

The measurement support information submission means 111 submits attribute information such as the addresses of the existing positions of the map change points, surrounding maps, and so forth, as measurement assistance information.

Processing summary display means 112 displays the outline of the processings of the map edition means 109, the imaging condition acquisition means 110a, the new image acquisition schedule submission means 110b and the measurement support information submission means 111 to the user, and promotes the user's judgement.

Processing result output means 113 outputs the processing results of the map edition means 109, the imaging condition acquisition means 110a, the new image acquisition schedule date submission means 110b and the measurement support information submission means 111 to a printer or to the memory unit 100.

Figure 2:
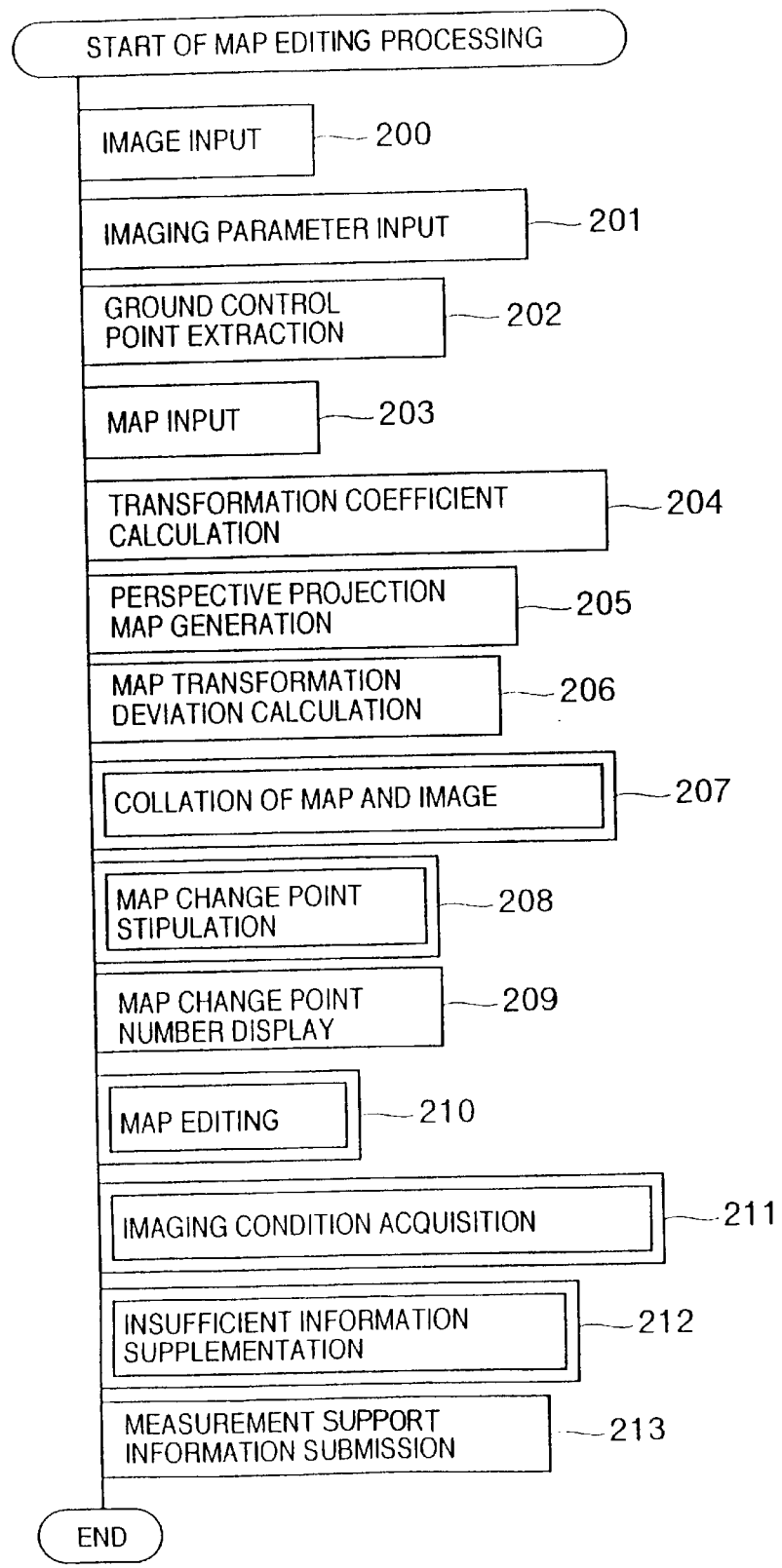
FIG. 2 is a flowchart showing the operation procedures of the map editing device according to an embodiment of the present invention.

FIG. 2 is a flowchart using the processing procedure of the map editing device 1.

Figure 7:
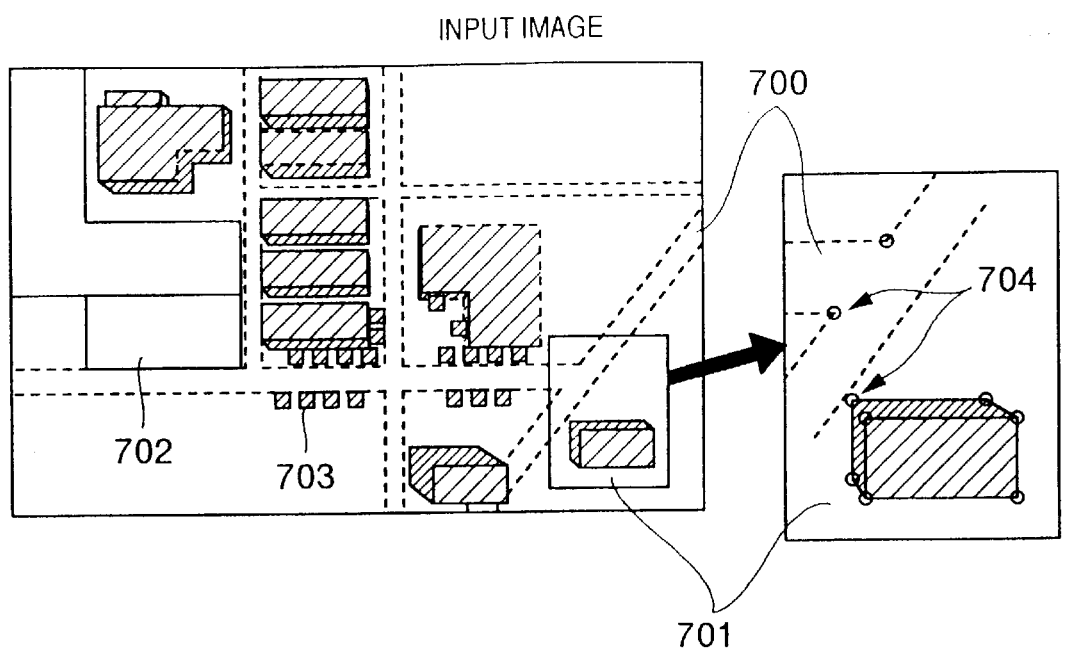
FIG. 7 is an exemplary view of an image used for map editing processing.

At the step 200, the image means 101 inputs the image of the management area of a community, for example, as digital images to the ground control point extraction means 103. More specifically, this input means 103 inputs digital images by reading aerial photographs or satellite photographs by a scanner, or down-loads the digital images through the network. Preferably, the digital images taken by satellite photograph are periodically down-loaded because the latest geographical information can be easily acquired. FIG. 7 exemplarily shows the inputted image.

At the step 201, the imaging parameters of the input image are inputted by the image input means 101 to the map retrieval input means 104 and the three-dimensional coordinates conversion means 105.

As the step 202, the ground control point extraction means 103 analyzes the image and extracts the point as the reference of the object (ground control point). More specifically, edge detection and tracing of the image are executed, the shapes of a road 700, a building 701, a field 702 and woods 703 are recognized in association with the color information, shape information, etc, of the object, and the characterizing points such as the end points, crossings, etc, of the shape contour lines are extracted as the ground control points 704.

Figure 8:
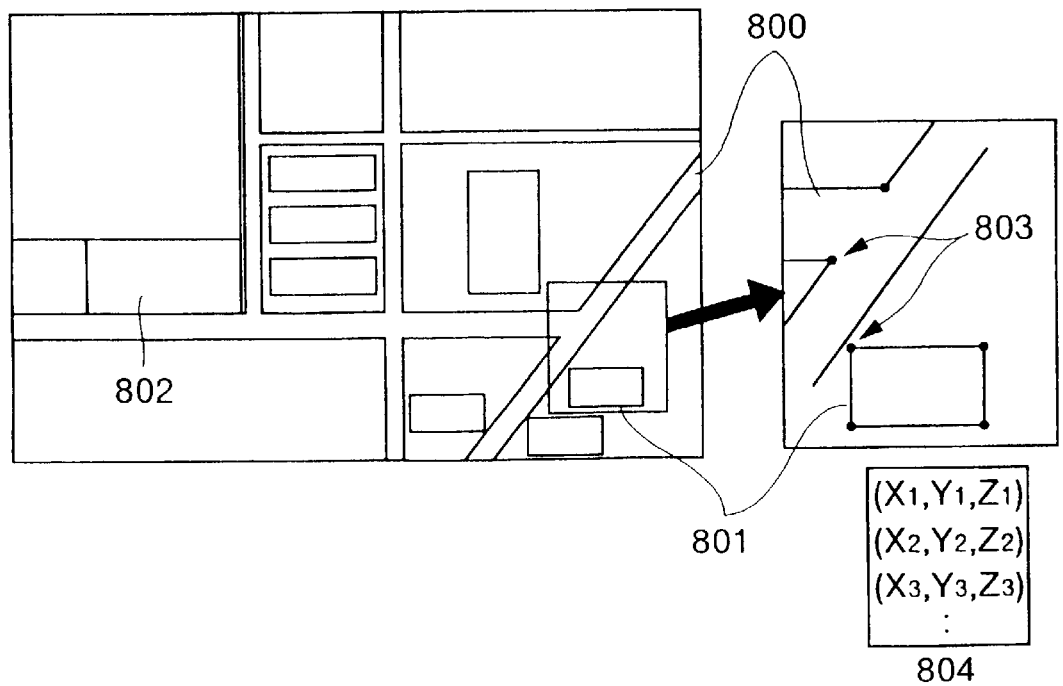
FIG. 8 is a conceptual view of a three-dimensional digital map.

At the step 203, the map retrieval means 104 retrieves the three-dimensional digital map corresponding to the imaging area of the image from the map file inside the memory device 100 on the basis of the inputted imaging parameters, and inputs it to the three-dimensional coordinates transformation means 105. FIG. 8 shows an example of the three-dimensional digital map. The three-dimensional map is generated by transforming the object shapes to vector data and adding height information and attribute information such as the address to individual objects. The objects in the three-dimensional digital map such as the road 800, the building 801, the field 802, etc, comprise sets of characterizing points 803 such as the point of intersection, the end points, etc, of the segments of lines, and are managed by a coordinate line 804 of (X, Y, Z). These characterizing points 803 are used as the map base points.

Figure 10A:
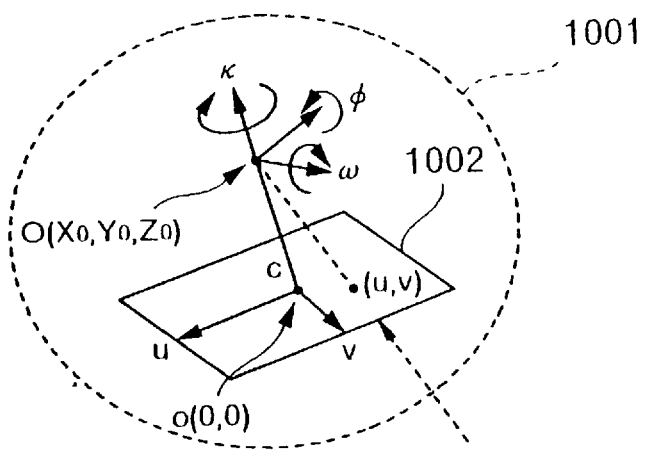
FIG. 10 is an explanatory view for explaining the generation of the perspective projection from a three-dimensional digital map.
Figure 10B:
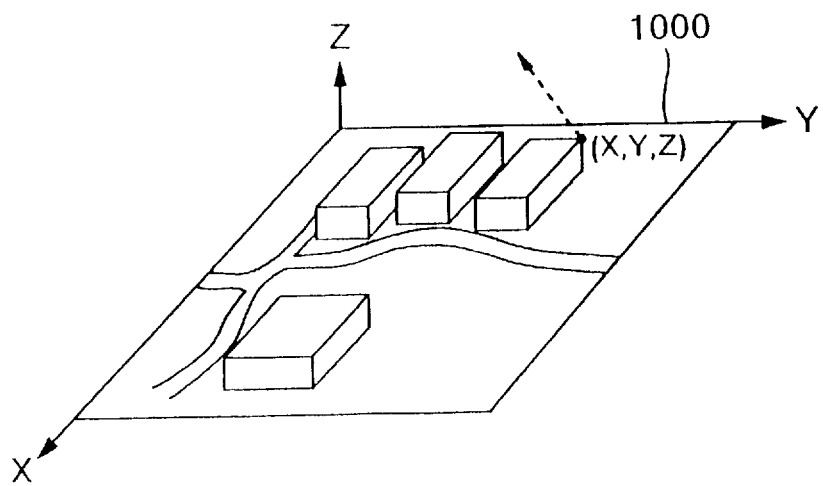

At the step 204, the three-dimensional coordinates transformation means 105 calculates a transformation coefficient from the inputted imaging parameters. As shown in FIG. 10, the three-dimensional coordinates system of the three-dimensional digital map 1000 is (X, Y, Z), the two-dimensional coordinates system of the projection plane 1002 corresponding to the plane of the inputted image is (u, v), the position of the projection center O of the camera 1001 on the (X, Y, Z) coordinates system is (XO, YO, ZO), the position o of a leg of a perpendicular drawn from the projection center O to the projection plane 1002 is the origin (O, O) of the (u, v) coordinates system, the screen distance (focal length) of the camera is c, the posture of the camera 1001 is ω to the left in the positive direction of the X axis, is φ to the left in the positive direction of the Y axis, and is κ to the left in the positive direction of the Z axis. In this instance, the transformation coefficient can be calculated from the following formula (1):

$$\begin{pmatrix} a11 & a12 & a13 \\ a21 & a22 & a23 \\ a31 & a32 & a33 \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} \cos\kappa & \sin\kappa & 0 \\ -\sin\kappa & \cos\kappa & 0 \\ 0 & 0 & 1 \end{pmatrix} \quad (1)$$

At the step 205, the three-dimensional coordinates transformation means 105 transforms the point (X, Y, Z) on the three-dimensional digital map 100 to the point (u, v) on the projection plane in accordance with the following formula (2), and generates the perspective projection map expressed by the same perspective projection as the image.

$$\left. \begin{array}{l} u = -c \dfrac{a11(X-X_0) + a12(Y-Y_0) + a13(Z-Z_0)}{a31(X-X_0) + a32(Y-Y_0) + a33(Z-Z_0)} \\ \\ v = -c \dfrac{a21(X-X_0) + a22(Y-Y_0) + a23(Z-Z_0)}{a31(X-X_0) + a32(Y-Y_0) + a33(Z-Z_0)} \end{array} \right\} \quad (2)$$

Figure 9:
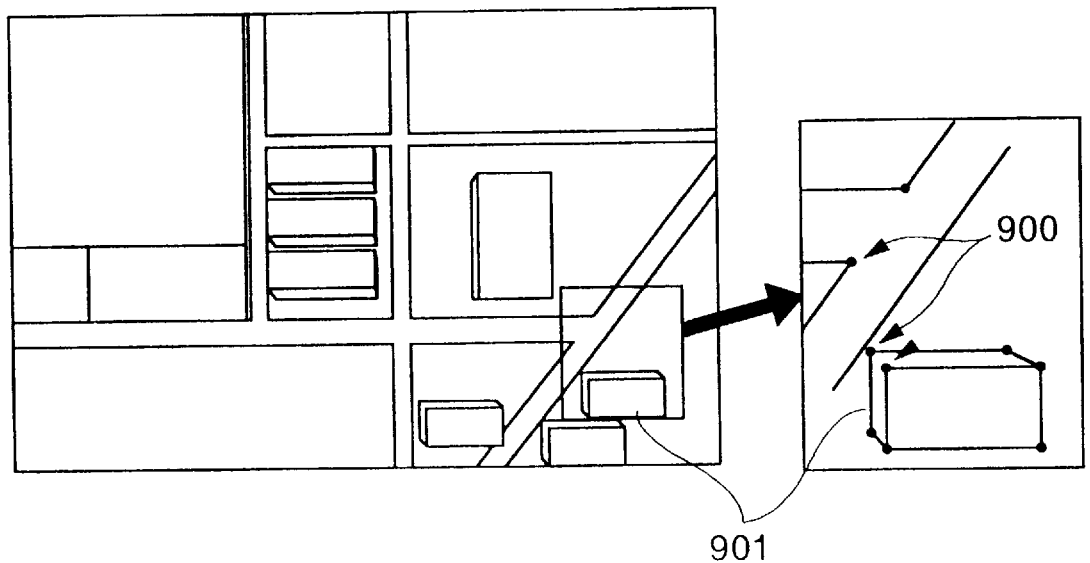
FIG. 9 is an exemplary view of a perspective projection map.

FIG. 9 exemplarily shows the perspective projection map generated from the three-dimensional digital map shown in FIG. 8. The object having a height such as the building 801 shown in FIG. 8 is expressed with a depth as represented by the building 901 shown in FIG. 9. The map base point 803 is converted to each map base point 900 shown in FIG. 9.

At the step 206, the three-dimensional coordinates transformation means 105 calculates the deviation δ (map transformation deviation) of the (u, v) coordinates from the deviations of the imaging parameters.

Figure 3:
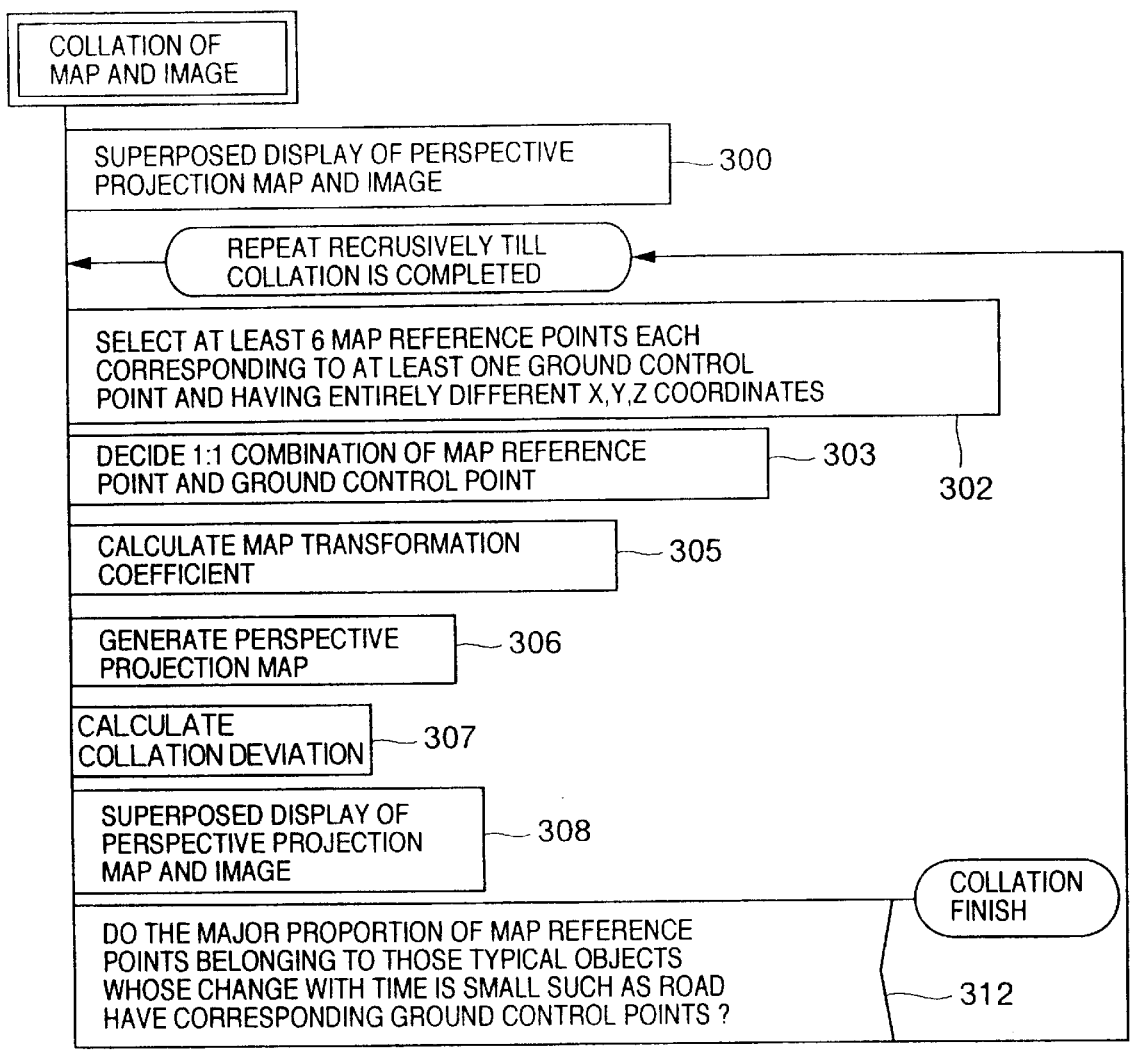
FIG. 3 is a flowchart showing a collation processing between a map and an image.

At the step 207, the collation means 106 executes the processings of steps 300 to 312 shown in FIG. 3, and collates the map, i.e., perspective projection map with the image.

FIG. 3 shows the flowchart of the collation procedures between the map and the image.

Figure 11A:
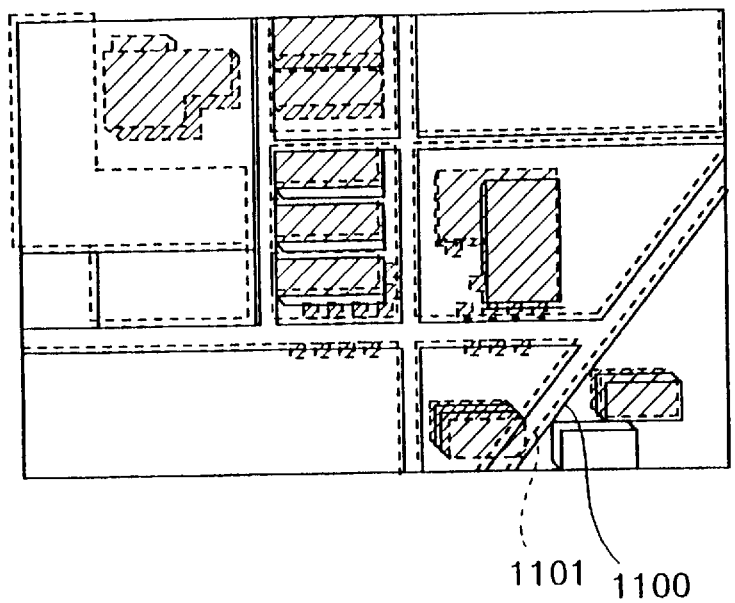
FIG. 11 is an exemplary view of a superposed view when an image and a perspective projection view are superposed with each other.
Figure 11B:
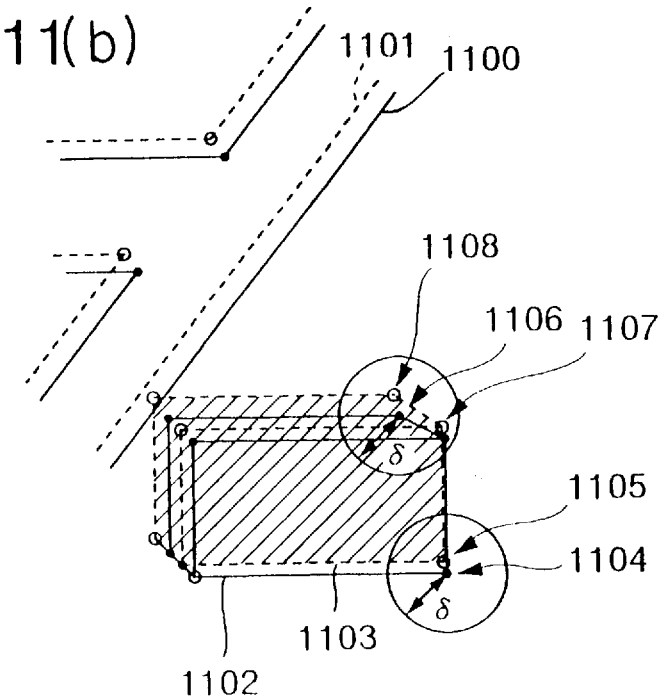
Figure 12:
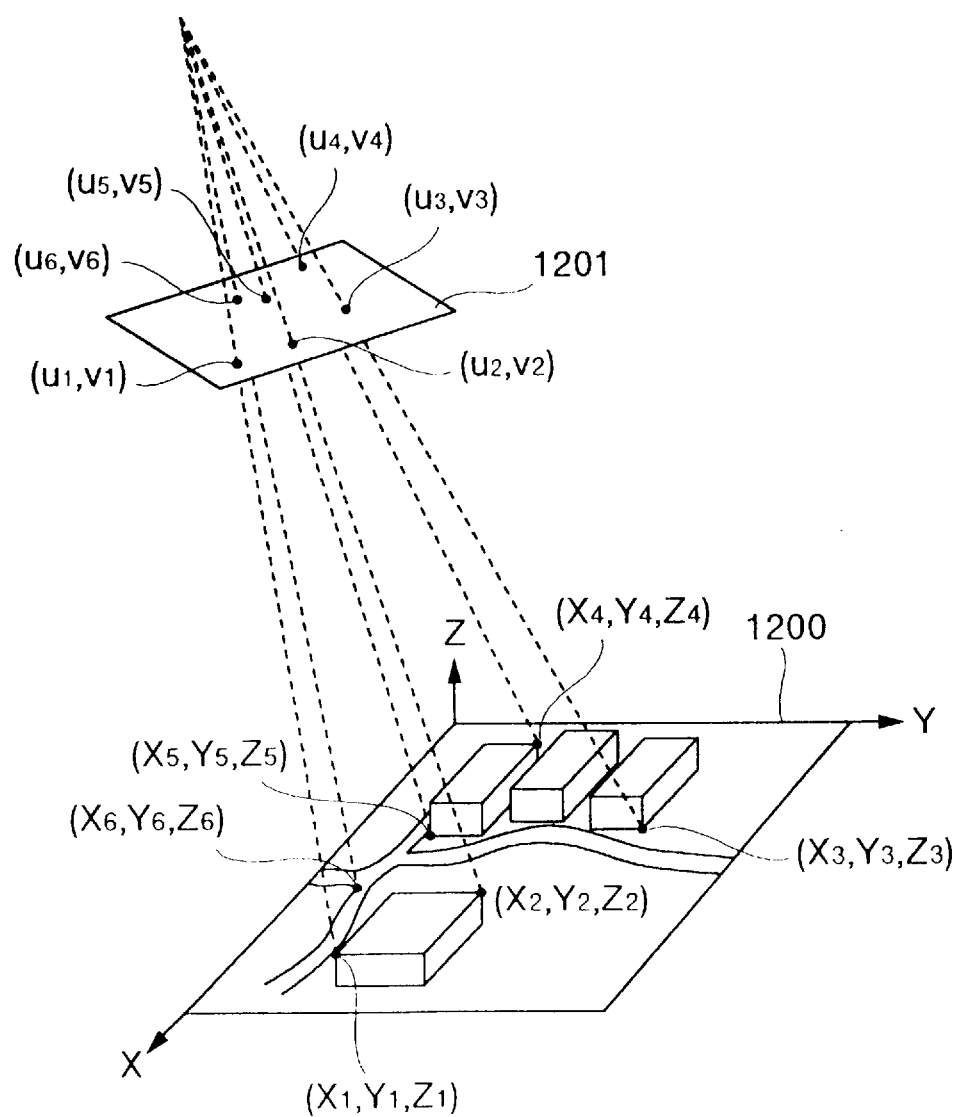
FIG. 12 is an explanatory view of a map reference point and a ground control point corresponding to the former.

At the step 300, the position of the camera in the image (when the camera position does not exist in the image, the image is expanded, and the camera position in that expanded image) is brought into conformity with the position of the camera in the perspective projection map (when the camera position does not exist in the perspective map, the perspective projection is expanded, and the camera position in that expanded perspective projection), and their directions are also brought into conformity with each other so as to overlap the image with the perspective projection map. Alternatively, the image and the perspective projection map are superposed with each other by the user's manual operation. FIG. 11 typically illustrate the image (dash line) and the perspective projection map (solid line) so superposed. If the map transformation deviation δ is "0", the image and the perspective projection map coincide with each other. Because δ is not "0" in practice, however, a position deviation occurs between the road 1101 in the image and the road 1100 in the perspective projection map as shown in FIG. 11. The position deviation occurs also between the building 1103 in the image and the building 1102 in the perspective projection map.

At the step 302, at least six map base points 1104 having mutually different X, Y, Z coordinates, in which at least one ground control point exists within the distance of the map transformation deviation δ, are selected uniformly and at random from the whole of the perspective projection map, and they are used as the map reference points. In FIG. 11, for example, the ground control point 1105 (white circle) exists within the distance of the map transformation deviation δ from the map reference point 1104 (black circle). The ground control points 1107 and 1108 (white circles) exist within the distance of the map transformation deviation δ from the map reference point 1106 (black circle).

At the step 303, the 1:1 combination of the map reference point and the corresponding ground control point is decided. In FIG. 11, for example, two ground control points 1107 and 1108 (white circles) exist within the distance of the map conversion deviation δ from the map reference point 1106 (black circle), but the nearest ground control point 1108 is selected to form the 1:1 set with the map reference point 1006 (black circle).

Steps 302 and 303 described above employ the system which automatically decides the set of the map reference point and the corresponding control point, but a system which designates the set of an appropriate map reference point and an image corresponding point by the user may also be employed.

At the step 306, the map reference points (X1, Y1, Z1) to (Xi, Yi, Zi) (i≧6) and the ground control points forming the sets with them, i.e. (I1, v1) to (ui, vi), are put into the following formula (3), and map transformation coefficients a1 to a11 and H are determined by the method of least squares. Here, H is a value associated with the screen distance (focal length) c of the camera.

$$\begin{pmatrix} Hu \\ Hv \\ H \end{pmatrix} = \begin{pmatrix} a1 & a2 & a3 & a4 \\ a5 & a6 & a7 & a8 \\ a9 & a10 & a11 & 1 \end{pmatrix} \begin{pmatrix} X \\ Y \\ Z \\ 1 \end{pmatrix} \quad (3)$$

At the step 307, the values of the coordinates points (u1', v1') to (u1', vi') are calculated from the map reference points (X1, Y1, Z1) to (Xi, Yi, Zi) by using the formula (4) obtained by putting the map transformation coefficients a1 to a11 and H, and the values of these coordinates points (u1', v1') to (ui', vi') are compared with (u1, v1) to (ui, vi) so as to calculate the collation deviation Δ.

$$u=Hu/H \quad v=Hv/H \quad (4)$$

At the step 308, the perspective projection map is generated from the three-dimensional digital map by using the map transformation coefficients a1 to a11 so calculated and the formula (4) described above, and the perspective projection map and the image are superposed.

Figure 13:
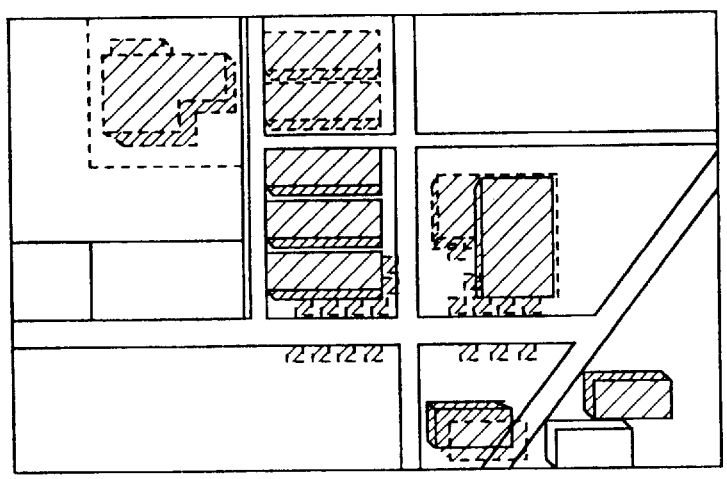
FIG. 13 is an exemplary view of a superposed view of a map reference point and a corresponding ground control point.

At the step 312, an object which is almost free from the shape change from the generation timing of the map to the imaging timing of the image is set as the reference object for the collation judgement. For example, a road is set as the reference for the collation judgement, and the map base point constituting the road in the map is discriminated from the attribute information imparted to the map. Other objects can be used as the reference for the collation judgement depending on the kind of the map. Objects having more detailed attributes such as a national highway or a prefectural road can be used as the reference for the collation judgement on the basis of the attribute information of the map. Next, whether or not the major proportion of the map base points used as the reference for the collation judgement have the corresponding ponding ground control points is judged. For example, whether or not the proportion of the existence of at least one ground control point within the distance of the collation deviation Δ from the ground control point exceeds 80% is determined. If the major proportion of the map base points used as the reference for the collation judgement have the corresponding ground control points, collation is completed. On the other hand, if the majority of the map base points used as the reference for the collation judgement do not have the corresponding ground control points, the flow returns to the step 302, and the steps 302 to 312 are executed recursively and repeatedly until the collation is completed. In this way, the position deviation at the time of superposition can be made small as shown in FIG. 13. Incidentally, the proportion as the reference of the judgement that "the majority of the major base points has the ground control points" is determined by the accuracy of extraction of the ground control points.

Figure 4:
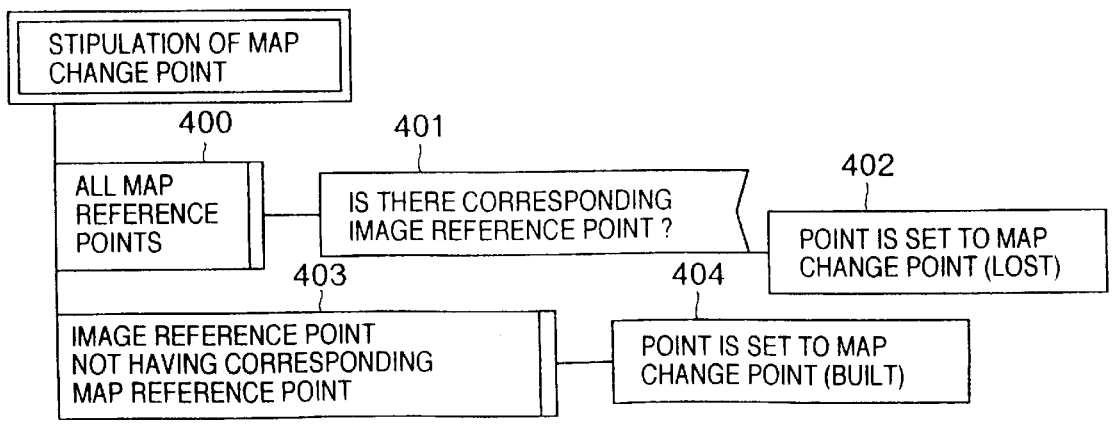
FIG. 4 is a flowchart showing a map change point stipulation processing.

Turning back again to FIG. 2, the map change point stipulation means 107 executes the processing of the steps 400 to 404 shown in FIG. 4 at the step 208, and stipulates the point (map change point) at which the change has occurred from the generation timing of the three-dimensional digital map to the imaging timing of the image.

FIG. 4 shows the flowchart of the stipulation procedures of the map change point.

At the step 400, one map base point is taken into consideration, and the execution of the step 401 for this map base point is repeated for all the map base points.

At the step 401, whether or not the ground control point exists within the range of the collation deviation Δ from the map base point exists is judged, and if it does, the flow returns to the step 400, and if it does not, the flow proceeds to the step 402.

Figure 14:
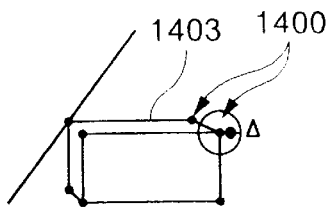
FIGS. 14(*a*)–(*c*) are explanatory views of a map change point.
Figure 14:
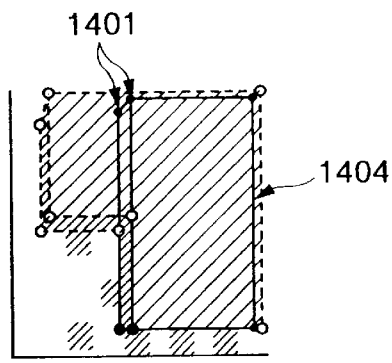
Figure 14:
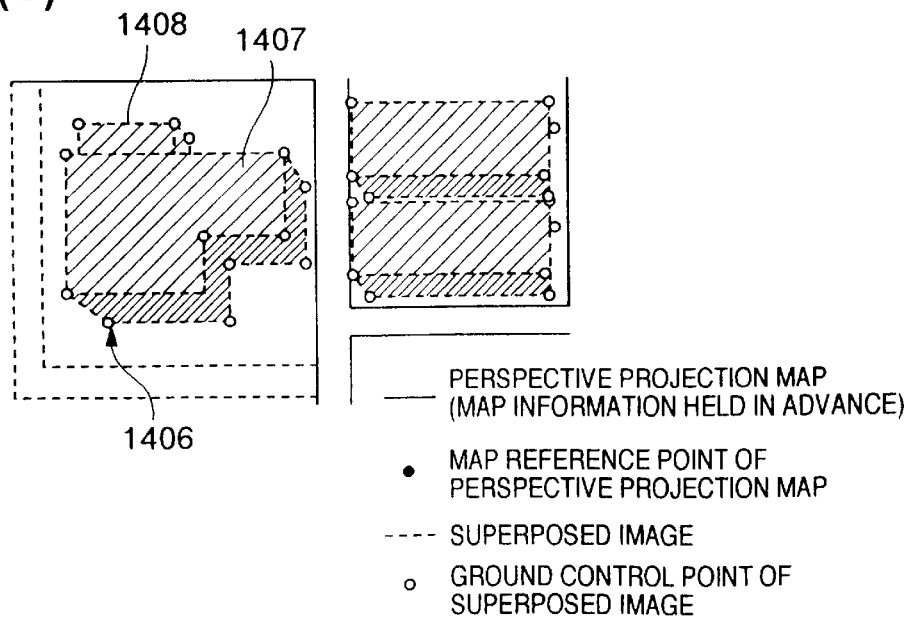
Figure 15:
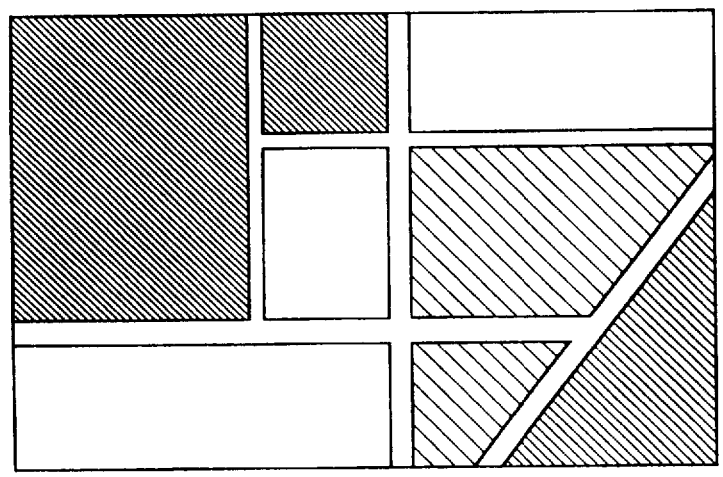
FIG. 15 is a distribution diagram of map change points.
Figure 15:
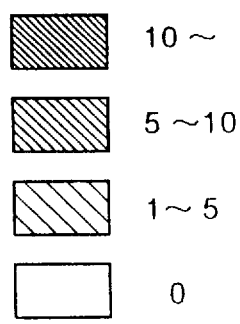

At the step 402, the map base point that is taken into consideration is set to the map change point (the object is lost). To explain the map change point, FIGS. 14(a) to 14(c) show a part of the drawing wherein an image (dotted line) obtained afresh is superposed with the perspective projection map (solid line). For example, ground control point does not exist within the range of the collation deviation Δ from the map base point 1400 shown in FIG. 14(a) and from the map base points 1401 and 1402 shown in FIG. 14(b), and they become the map change points.

At the step 403, one ground control point which does not correspond to any map base point is taken into consideration, and the execution of the step 404 for this ground control point is repeated for all the ground control points that do not correspond to any map base points.

At the step 404, the map base point which is taken into consideration is set to the map change point (the object is built). For example, the map base point does not correspond to the ground control point 1406 shown in FIG. 14(c), and they are judged as the map change points.

Turning back to FIG. 2, the map change point number submission means 108 calculates the number of the map change points per administrative district or per block, or the density of the map change points per unit area, and graphically shows the calculation result. The user can judge the preferential area of the map editing on the basis of this graphic display.

Turning back further to FIG. 2, the map editing means 109 edits the three-dimensional digital map on the basis of the map change points at the step 210.

Figure 5:
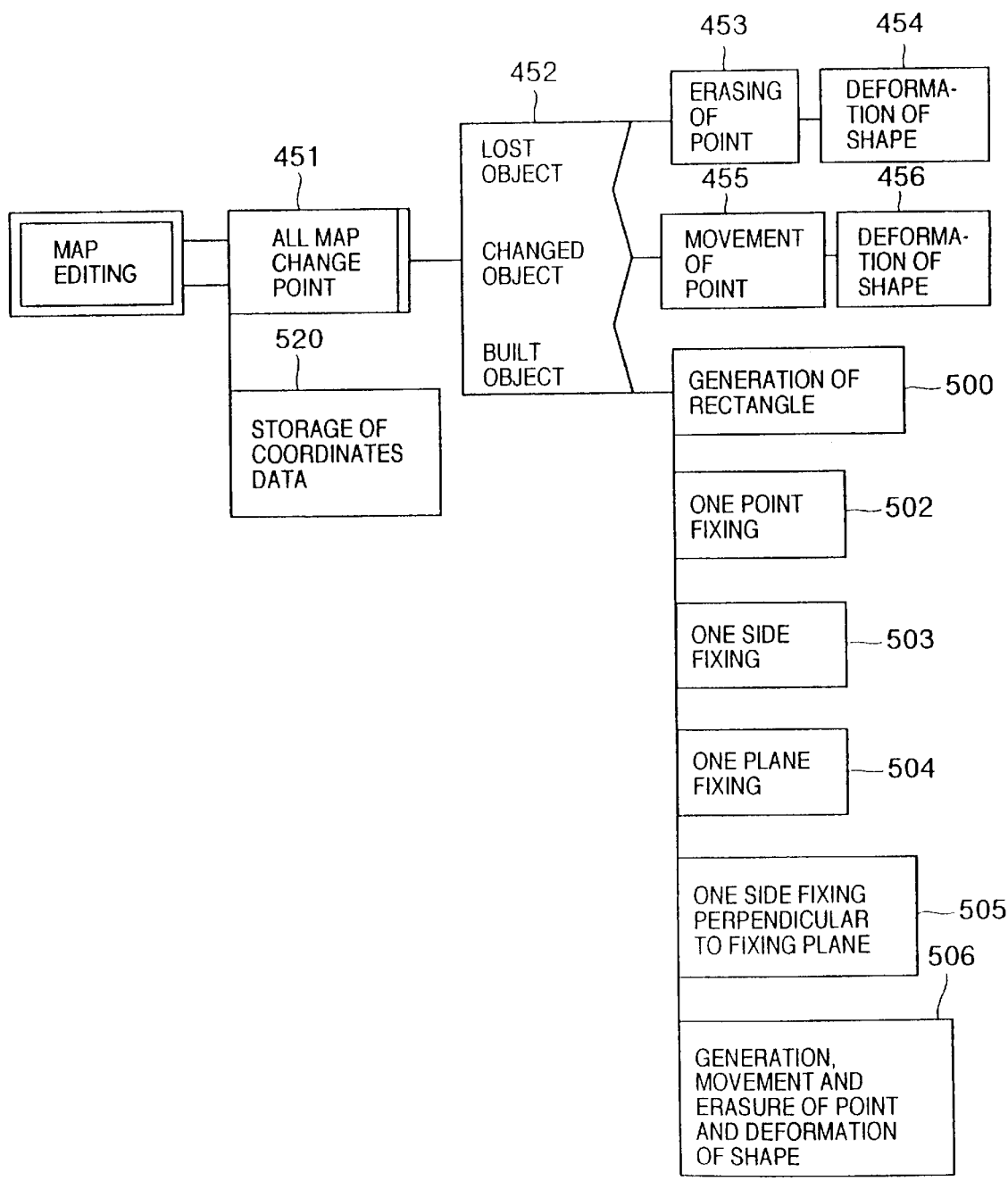
FIG. 5 is a flowhcart showing map editing processing.

FIG. 5 is a flowchart showing the map editing procedure.

At the step 451, one map change point is taken into consideration, and the execution of the step 452 for this map change point is repeated for all the map change points.

At the step 452, whether the type of the map change point is a lost object or a changed object or a built object is judged by considering the map change point taken into consideration or the information of the map base point or the ground control point linked with this map change point. When the type of the map change point is the lost object, the flow proceeds to the step 453, if it is the changed object, the flow proceeds to the step 455, and if it is the build object, the flow proceeds to the step 500.

The map change point of the lost object will be explained with reference to FIGS. 16(a) and (b).

Figure 16:
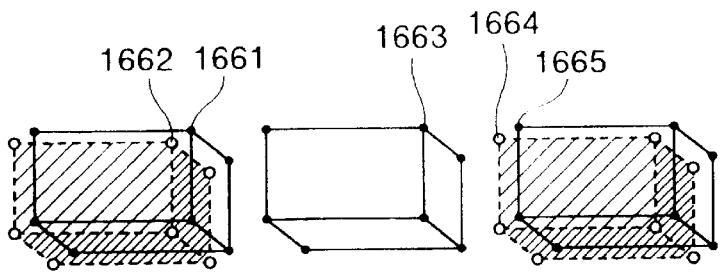
FIGS. 16(*a*)–16(*b*) are explanatory views of map editing processing relating to a map change point of a lost object.
Figure 16:
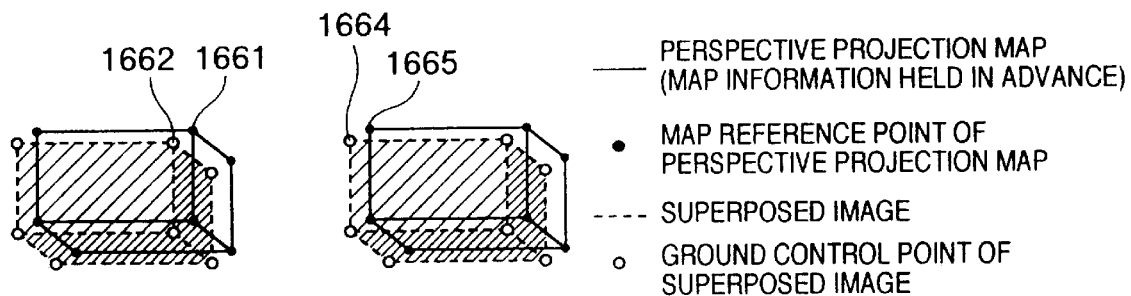

FIG. 16(a) is an example of the drawing showing the superposition of the perspective projection map that is held in advance (contour is represented by solid line and the black circle represents the map base point) and the image that is newly acquired (contour is represented by dotted line, the inside of the building is represented by oblique line and white circle represents the ground control point). The perspective projection map of FIG. 16(a) shows three buildings. However, the acquired image represents only two buildings. From the relationship between the map reference point and the ground control point, the ground control point 1662 within the distance of the map change deviation of the map reference points (1661, 1663, 1664) corresponds to 1661, and 1664 corresponds to 1665 but the ground control point corresponding to the map reference point 1663 does not exist. Therefore, the map reference point 1663 is judged as the map change point of the lost object.

At the step 453 of FIG. 5, the map base points that are judged as the map change point of the lost object are erased. In FIG. 16(a), for example, all the map reference points constituting the building to which the map reference point 1663 belongs are erased as shown in FIG. 16(b). As a result of erasure, only two buildings remain. At the step 454, necessary deformation of the shapes (correction of the attribute information) is executed.

The map change point of the changed object will be explained with reference to FIGS. 17(a) and 17(b).

Figure 17:
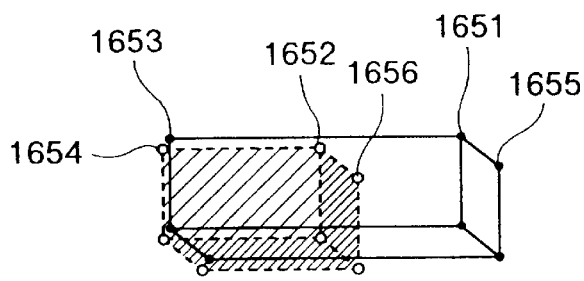
FIGS. 17(*a*) and 17(*b*) are explanatory views of map editing processing relating to a map change point of a changed object.
Figure 17:
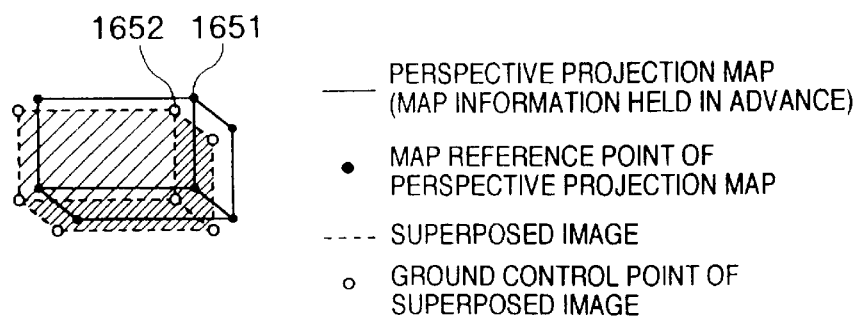

FIG. 17(a) is an example of the drawing showing in superposition the perspective projection map held in advance (contour is represented by solid line and black circle represents the map reference point) and the image acquired afresh (contour is represented by dotted line, the inside of the building is represented by oblique line and white circle represents the ground control point). In FIG. 17(a), the shape of the building by the perspective projection map to which the map reference points 1651, 1653 and 1655 belong and the shape of the input image to which the ground control points 1652, 1654 and 1656 belong are different. This difference can be judged from the existence of the point at which the ground control point does not exist within the distance of the map change deviation, and such map reference points 1651 and 1655 are judged as the map change points of the changed object.

At the step 455 shown in FIG. 5, the map base point judged as the map change point of the changed object is moved to the positions of the other map reference point (1653) and other ground control points (1652, 1656) of the image to which the corresponding ground control point (1654) belongs. FIG. 17(b) shows the result of movement. FIG. 17(b) shows the state where the map reference point as the map change point of the changed object is moved to the position of the corresponding image change point. In other words, the shapes of the buildings of the perspective projection map and the input image coincide with each other, and the map reference point 1651 corresponds to the ground control point 1652. At the step 456, necessary modification of the shape (correction of attribute information) is executed.

The map change point of the build object will be explained with reference to FIGS. 18(a) to 18(g).

When the perspective projection map corresponding to the newly acquired image 1601 (contour is represented by dotted line, the inside is represented by oblique lines and white circle represents the ground control point) does not exist, this new image 1601 is used as the object 1601 constituted by the map change point of the build object. As shown in FIG. 18(a), a rectangle 1600 having a size substantially equal to that of the object 1601 is generated in the proximity of the object 1601 constituted by the ground control point as the map change point of the build object (step 500).

At the step 502, the rectangle 1600 is moved (fixed at one point) in such a manner that one 1602 of the apexes thereof coincides with the ground control point 1603 of the object 1601 corresponding thereto, as shown in FIG. 18(b).

At the step 503, the rectangle 1600 is deformed (fixed at one side) in such a manner that the apex 1605 at the other end of the side 1604 having the apex 1602, which is fixed at the step 502 at one of the ends thereof, coincides with the ground control point 1606 of the corresponding object 1601 as shown in FIG. 18(c).

At the step 504, the rectangle 1600 is deformed (fixed on one plane) in such a manner that the apex 1608 of the opposed side of the plane 1607 having the side 1604, which is fixed at the step 503, as one of the sides thereof coincides with the ground control point 1609 of the corresponding object 1601.

At the step 505, the rectangle 1600 is deformed (fixed on one side perpendicular to the fixed plane) in such a manner that the apex 1611 at the other end of the side 1610 perpendicular to the plane 1607, which is fixed at the step 504, coincides with the ground control point 1612 of the corresponding object 1601 as shown in FIG. 18(e).

At the step 506, the map base point is generated, moved and erased so that the rectangle 1600 and the object 1601 coincide with each other, and the rectangle 1600 is deformed. In other words, as shown in FIG. 18(f), the map base points 1613 and 1614 are generated on the side of the rectangle 1600, or the apexes 1615 and 1617 are moved to the positions of the ground control points 1616 and 1618. In this way, the object frame comprising the map base points having the shape coincident with that of the object 1601 can be obtained as shown in FIG. 18(g).

Incidentally, a part of the building 1408 (corresponding to 1620 in FIG. 18) shown in FIG. 14(c) is concealed by the building 1407 (corresponding to 1601 in FIG. 18), and the information on this building 1408 is not sufficient. In such a case, the map base points can be set provisionally at suitable positions in accordance with the user's instruction.

At the step 520, each apex of the object frame obtained at the steps 451 to 506 is used as the map base point, the (X, Y, Z) coordinates are calculated from the formula (3), the three-dimensional digital map is updated by adding the attribute to these coordinates data, and the updated data are output to the memory device 100.

Turning back to FIG. 2, the imaging condition for supplementing the insufficient information is acquired by the imaging condition acquisition means 110a at the step 211. For example, the building 1408 in FIG. 14(c) is partly concealed by the building 1407 and the information about this building 1408 is therefore insufficient.

Figure 6:
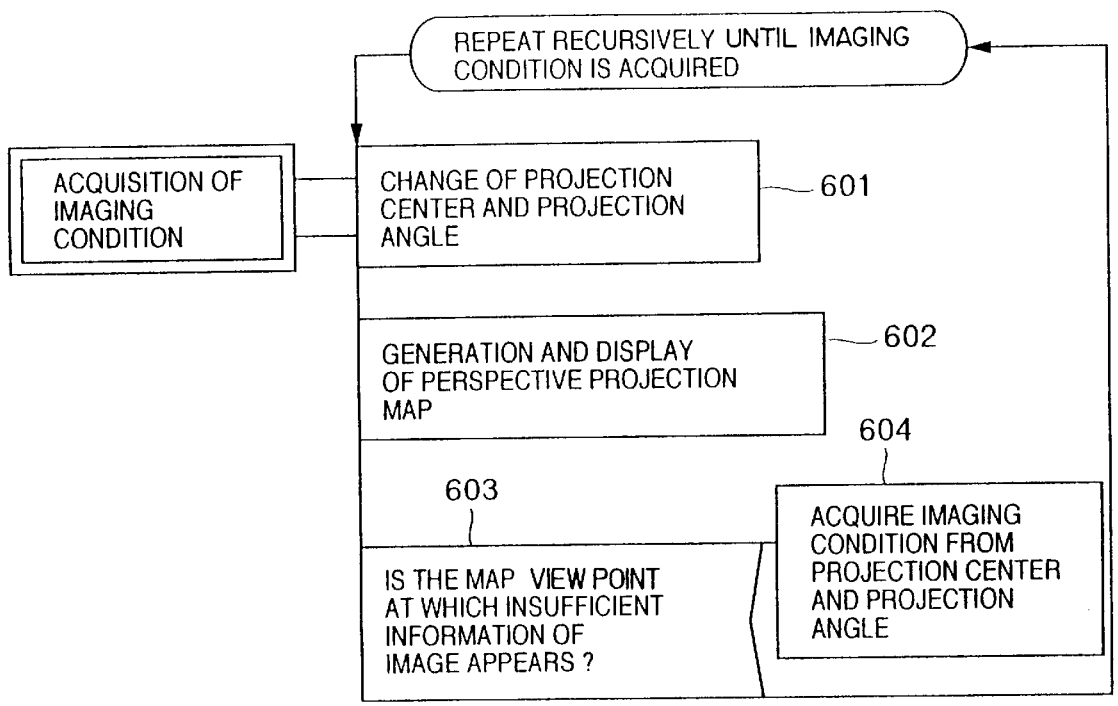
FIGS. 6(*a*) and 6(*b*) are flowcharts showing an imaging condition acquisition processing and an insufficient information supplementation processing.
Figure 6:
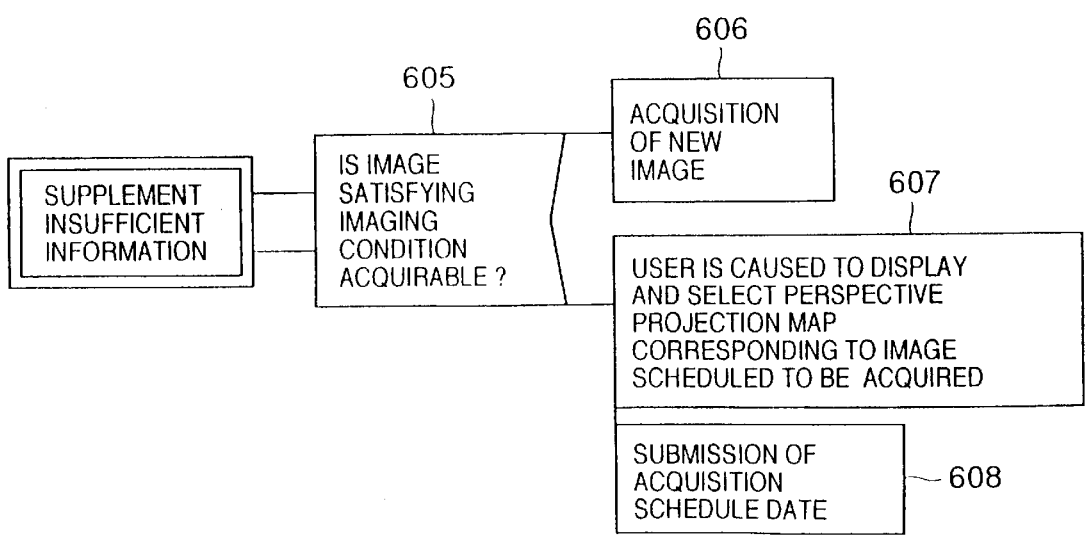

FIG. 6(a) is the flowchart of the imaging condition acquisition procedure.

Figure 19:
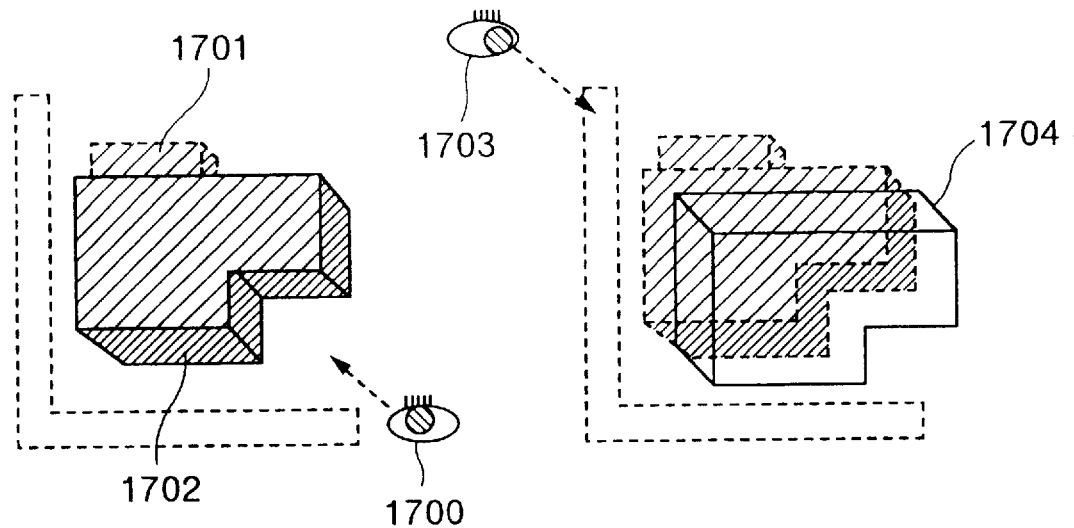
FIGS. 19(*a*)–19(*b*) are explanatory views of a change of a projection center and a projection angle.

At the step 601, the position of the camera in the perspective projection map (when the camera position does not exist in the perspective projection map, the perspective projection map is expanded, and the camera position in the expanded perspective projection map) and the projection angle are displayed as the map visual point 1700 on the superposition map as shown in FIG. 19(a), and the user is caused to conduct the operation for changing this position and the projection angle.

At the step 602, the perspective projection map 1704 is generated by using the map visual point 1703 so changed as the projection center as shown in FIG. 19(b) and is displayed in superposition with the image (dash line).

At the step 603, the user judges whether or not the insufficient information in the image reaches the map visual point appearing on the perspective projection map, and when such a map visual point is reached, the flow proceeds to the step 604 and if it does not, the flow returns to the step 601 and the steps 601 to 603 are recursively executed repeatedly until such a map visual point is reached.

At the step 604, the imaging parameters of the image are updated by the position of the map view point and the projection angle at which the insufficient information of the image appears on the perspective projection map (other parameters such as an altitude are not updated), and the updated data are used as the imaging condition.

Turning back to FIG. 2, the insufficient information in the image is supplemented at the step 212.

FIG. 6(b) is a flowchart showing the supplementation procedure of the insufficient information.

At the step 605, the imaging condition acquisition means 110a retrieves whether or not the image satisfying the imaging condition can be immediately acquired from the memory device 100 or the network, and if it can be acquired immediately, the flow proceeds to the step 606 and if not, to the step 607.

At the step 606, the image input means 101 inputs the image satisfying the imaging condition from the memory device 100 or the network.

Figure 20:
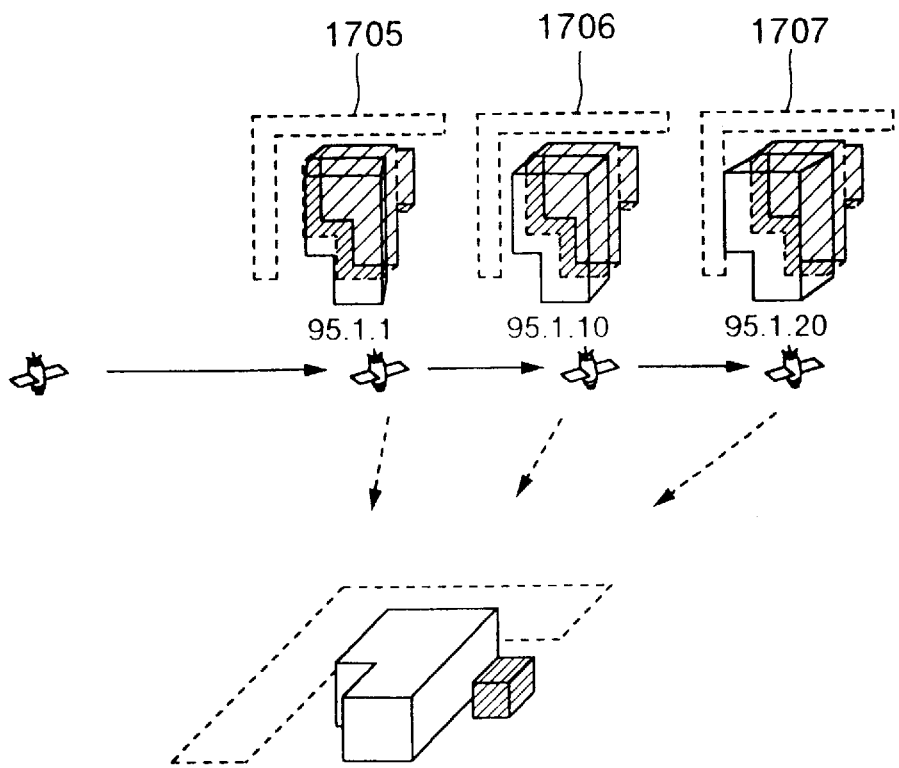
FIG. 20 is an explanatory view of a screen offering a new image acquisition schedule date.
Figure 21:
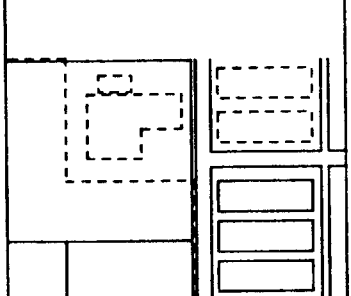
FIG. 21 is an exemplary view of a screen offering a new image acquisition schedule date.

When the schedule of the acquirable image is known in advance such as remote sensing by a satellite, the new image acquisition schedule date submission means 110b examines the period in which the image approximate to the imaging condition can be input. If this period is from Jan. 1, 1995 to Jan. 20, 1995, for example, the perspective projection maps from the perspective projection map 1705 corresponding to the image, which is scheduled to be acquired on Jan. 1, 1995, to the perspective projection map 1707 corresponding to the image, which is scheduled to be acquired on Jan. 20, 1995, are serially generated and are displayed as shown in FIG. 20. The user is allowed to select a suitable map from among the perspective projection maps so displayed.

At the step 608, the acquisition schedule date of the image corresponding to the perspective projection map selected by the user is submitted.

Figure 18:
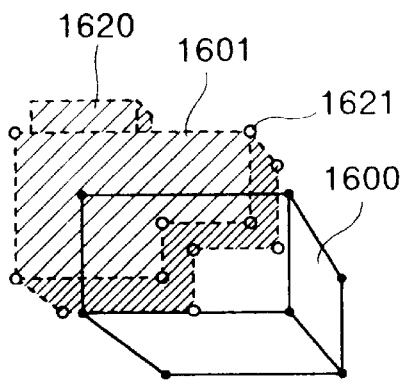
FIGS. 18(*a*)–18(*g*) are explanatory views of map editing processing relating to a map change point of a built object.
Figure 18:
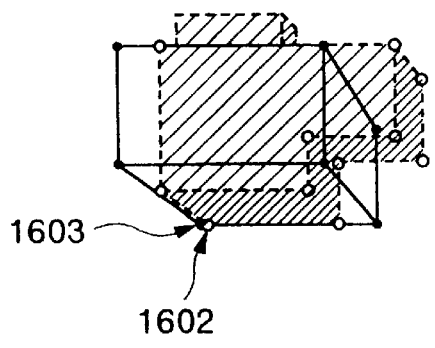
Figure 18:
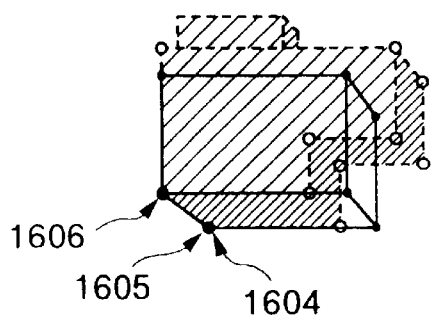
Figure 18:
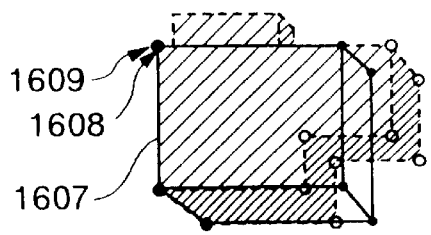
Figure 18:
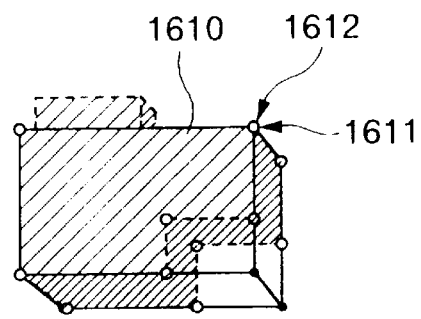
Figure 18:
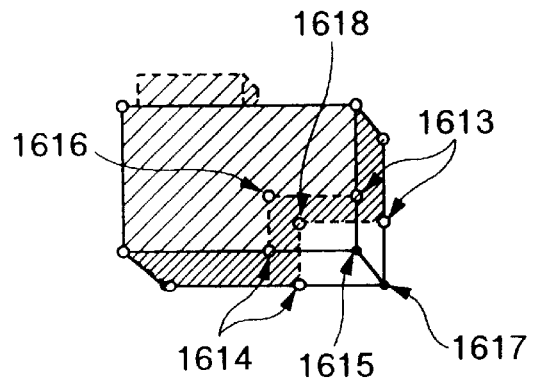
Figure 18:
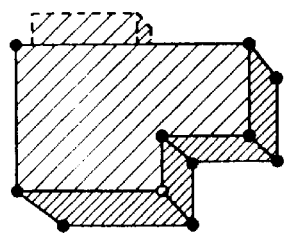

Turning back again to FIG. 2, the measurement assistance information submission means 111 provides the measurement assistance information necessary for re-measurement of the area designated by the user, at the step 213. When the user designates the area covering the map change points as shown in FIG. 18, for example, this submission means 111 submits the measurement assistance information such as the address of the area, the size of the area, the date of the latest measurement, etc.

Figure 22:
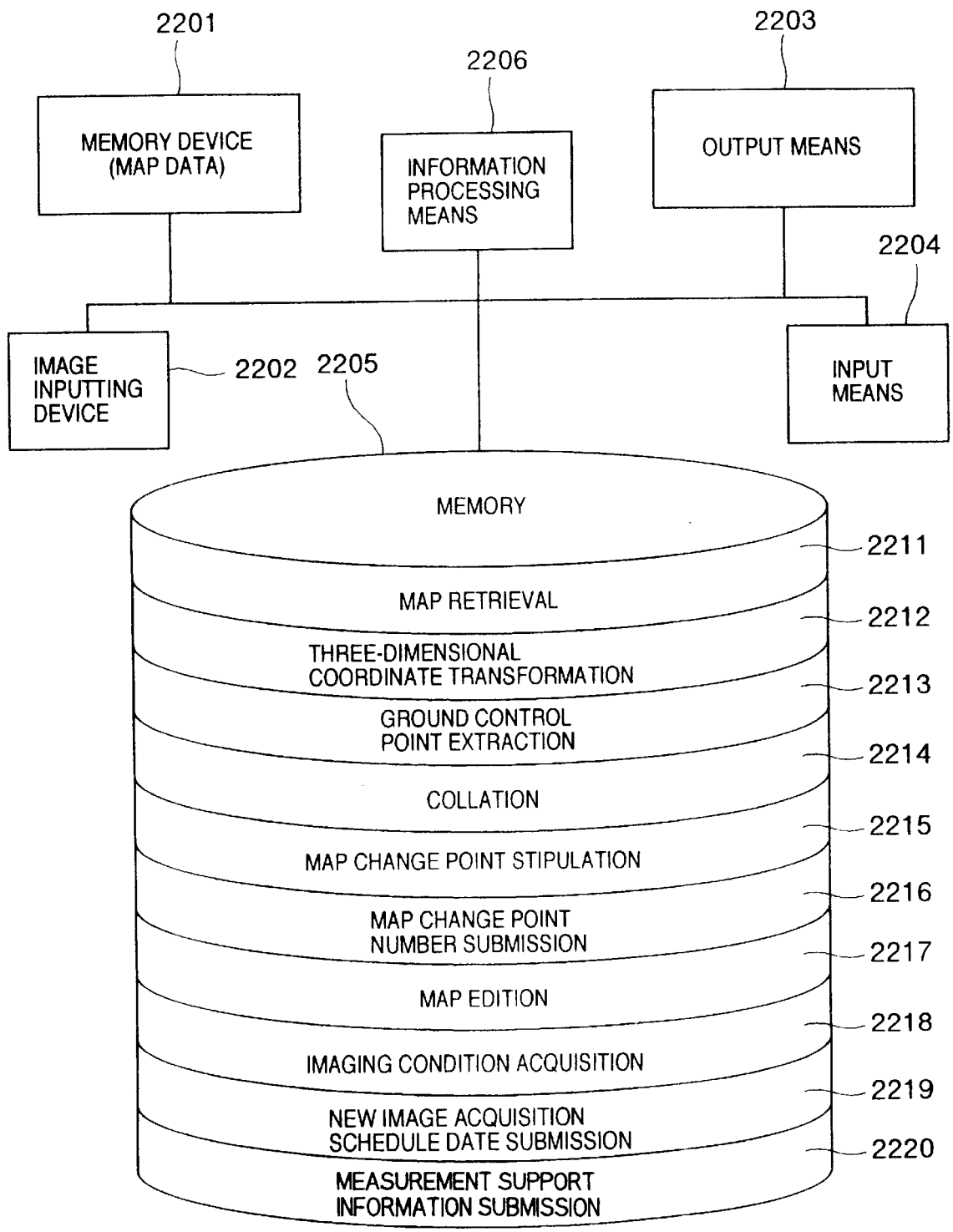
FIG. 22 is a system structural view when the present invention is accomplished by software.

The procedures explained so far have been expressed by the hardware means as shown in FIG. 1. However, the present invention can also be accomplished by assembling software in a computer system having an ordinary construction comprising a memory device 2201 for storing map data, an image inputting device 2202 for acquiring new map images, output means 2203 for outputting a processing course and a processing result, input means 2204 for inputting processing commands from outside, a memory 2205 having various processing programs and memory areas, and information processing means 2206 for executing processings in accordance with the processing program in the memory, as shown in FIG. 22. The term "assembling the softwares" means that the same function as the one shown in FIG. 1, that is, the function of the present invention, is accomplished by executing the program stored in the memory 2205 by the information processing portion.

The memory 2205 may be a disk drive to which a removal medium such as a magnetic disk, an optical disk, an opto-magnetic disk, a DVD, or the like, is loaded. In such a case, the program stored in the medium includes the map retrieval program 2211, the three-dimensional coordinates transformation program 2212, the ground control point extraction program 2213, the collation program 2214, the map change point stipulation program 2215, the map change point number submission program 2216, the map edition program 2217, the imaging condition acquisition program 2218, the new image acquisition schedule date submission program 2219, the measurement support information submission program 2220, and an alternate program necessary for the activation of the system and the memory area of the information, the latter two not shown in the drawing.

The system shown in FIG. 22 executes the processing explained with reference to FIG. 2 by executing the program of the memory 2205 by the information processor 2206.

The image is inputted from the image inputting device 2202 (a scanner, for example) (step 200 in FIG. 2). The imaging parameters are inputted from the input means 2204 (a keyboard or a mouse, for example) (step 201 in FIG. 2). The ground control point is extracted by moving the ground control point extraction program 2213 (step 202 in FIG. 2). The input of the map is read out from the memory device 2201 in accordance with the map retrieval program 2211 (step 203 in FIG. 2). The transformation coefficient is calculated from the parameters inputted by the three-dimensional coordinates transformation program 2212 (step 204 in FIG. 2), and the perspective projection map is generated in accordance with the formula (2) (step 205 in FIG. 2). Further, the deviation δ is calculated (step 206 in FIG. 2). The collation program 2214 executes the processing shown in FIG. 3 and collates the map with the input image (step 207 in FIG. 2). The map change point stipulation program 2215 executes the processing shown in FIG. 4 and stipulates the map change point (step 208 in FIG. 2). The map change point number submission program 2216 calculates the density of the map change points within a specific range and displays it by the output means (step 209). The map edition program 2217 executes the processing shown in FIG. 5 on the basis of the map change point acquired from the map change point stipulation program 2215 and edits the three-dimensional digital map (step 210 in FIG. 2). The imaging condition acquisition program 2218 acquires the imaging condition in accordance with the processing shown in FIG. 6(a) (step 211 in FIG. 2). When the information is insufficient, the new image acquisition schedule date submission program 2219 executes the processing in FIG. 6(b) to supplement the insufficient information (step 212 in FIG. 2). The measurement assistance information submission program 2220 submits the measurement assistance information necessary when re-measurement of the area designated by the user is carried out (step 213 in FIG. 2). In this way, a series of processings are executed.

The map editing device or the map editing program according to the present invention provides the following effects and advantages.

(1) Even when a building is lost or newly built, the three-dimensional digital map can be updated automatically. Therefore, the burden to the user for updating the map can be reduced.

(2) Areas having many changes of the objects can be easily grasped, and the re-measurement plan can be easily established.

(3) Because the attribute information such as the address of the existing position of the map change point can be acquired, the re-measurement plan can be easily established.

(4) The date on which the image sufficing the insufficient information for updating the three-dimensional digital map can be acquired is submitted.

(5) The image sufficing the insufficient information for updating the three-dimensional digital map can be acquired from the data base or the network.

(6) It is possible to know the imaging condition for acquiring the information which is insufficient for updating the three-dimensional digital map.

The invention has been described with reference to the preferred and alternate embodiments. Obviously, modifications and alternations will occur to those of ordinary skill in the art upon reading and understanding the present invention. It is intended that the invention be construed as including all such modifications and alternations in so far they come with the scope of the appended claims or the equivalent thereof.

We claim:

1. A map editing device for assisting updating of a three-dimensional digital map of an area, using images obtained by imaging said area, comprising:

coordinates transformation means for generating a perspective projection map of a coordinates system on which said images are based, from said three-dimensional digital map by utilizing imaging parameters of said images;

collation means for collating a map base point representing a reference point of the shape of an object contained in said perspective projection map, with a ground control point representing a reference point of the shape of an object included in said images;

map change point stipulation means responsive to the collation by said collation means for specifying a map change point at which the object changes, from said map base point and said ground control point which are determined not to correspond to each other;

map editing means responsive to said map change point stipulation means for editing a three-dimensional digital map on the basis of said map change point specified by said stipulation means;

perspective projection map display means for generating a new perspective projection map based on a projection center and a projection angle changed by a user's instruction and the three-dimensional digital map after said editing by said map editing means, and displaying said new perspective projection map on a display; and imaging condition acquisition means for acquiring an imaging condition corresponding to the projection center and the projection angle instructed by the user.

2. A map editing device according to claim 1, which further includes additional image acquisition means for acquiring a new image corresponding to said imaging condition.

3. A map editing device according to claim 1, which further includes new image acquisition schedule date submission means for reporting the date on which a new image corresponding to said imaging condition can be acquired.

4. A map editing device according to claim 1, which further includes measurement assistance information submission means for submitting attribute information including the address of the existing position of the map change point, etc, as measurement assistance information.

5. A map editing device for assisting updating of a three-dimensional digital map of an area by using images obtained by imaging said area, comprising:

coordinate transformation means for generating a perspective projection map of a coordinate system on which said images are based, from said three-dimensional digital map by utilizing imaging parameters of said images;

collation means for collating a map base point as the reference of the shape of an object contained in said perspective projection map with a ground control point as the reference of the shape of an object contained in said images;

map change point stipulation means for stipulating a map change point at which an object changes, from said map base point and said ground control point not corresponding to each other; and map change point number submission means for calculating the number or density of map change points of said area as a whole or a region inside said area, and submitting the number or the density.

6. A map editing device for assisting updating of a three-dimensional digital map of an area by using images obtained by imaging said area, comprising:

coordinates transformation means for generating a perspective projection map of a coordinates system on which said images are based, from said three-dimensional digital map by utilizing imaging parameters of said images;

collation means for collating a map base point as the reference of the shape of an object contained in said perspective projection map with a around control point as the reference of the shape of an object contained in said images; and map editing means for adding a new object to said three-dimensional digital map on the basis of a ground control point not having a map base point corresponding thereto, and deleting an object corresponding to a map base point on the basis of said map base point not having a ground control point corresponding thereto, from said three-dimensional digital map.

7. A computer readable memory medium storing a map editing program, said map editing program including:

a step of inputting map information from a memory device inside a system and generating a perspective projection map from said map information;

a step of inputting map images;

a step of collating said perspective projection map with said map images, and detecting the different point as a map change point;

a step of editing said map information on the basis of said map change point; and a step of calculating an imaging condition so as to acquire an image containing said map change point.

8. A computer memory for directing a map editing operation on the computer, said memory including:

means for inputting map information from a memory device inside a system and generating a perspective projection map from said map information;

means for inputting map images;

means for collating said perspective projection map with said map images to detect a different point as a map change point;

means for editing said map information on the basis of said map change point; and means for calculating an imaging condition so as to acquire an image containing said map change point.

9. A method for editing map information of an area, using images obtained by imaging said area, said method comprising the steps of:

generating a perspective projection map from said map information;

collating said perspective projection map with said images;

detecting a point in said area which does not have correspondence between said perspective projection map and said images;

editing said map information at said point in such manner that said map information corresponds to said images; and calculating an imaging condition so as to acquire an image including said point.

10. A method for editing map information of an area according to claim 9, wherein said images include satellite images.

11. A method for editing map information of an area according to claim 9, further comprising the step of submitting a period when a satellite can take a satellite image corresponding to said imaging condition.

12. A method for editing map information of an area according to claim 9, wherein the step of collating said perspective projection map with said images comprises the sub-steps of:

specifying a map base point representing a reference point of the shape of an object contained in said perspective projection map and a ground control point representing a reference point of the shape of an object contained in said images; and collating a map base point with a ground control point.

13. A method for editing map information of an area according to claim 12, wherein the step of detecting a point in said area, comprises the step of detecting a map base point which does not have the corresponding ground control point, and a ground control point which does not have the corresponding map base point.

* * * * *